US011230657B2

(12) United States Patent
Saleh et al.

(10) Patent No.: US 11,230,657 B2
(45) Date of Patent: Jan. 25, 2022

(54) MODIFIED GRAPHENE SHALE INHIBITORS (71) Applicants: SAUDI ARABIAN OIL COMPANY, Dhahran (SA); KING FAHD UNIVERSITY OF PETROLEUM & MINERALS, Dhahran (SA)

(72) Inventors: Tawfik Abdo Saleh, Dhahran (SA); Mohammed Khalid Al-Arfaj, Dhahran (SA); Azeem A. Rana, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 16/806,804

(22) Filed: Mar. 2, 2020

(65) Prior Publication Data
US 2021/0269698 A1 Sep. 2, 2021

(51) Int. Cl.
C09K 8/22 (2006.01)
C09K 8/03 (2006.01)
C01B 32/23 (2017.01)

(52) U.S. Cl.
CPC ............ C09K 8/032 (2013.01); C01B 32/23 (2017.08); C09K 2208/12 (2013.01)

(58) Field of Classification Search
CPC ...... C09K 8/032; C09K 2208/12; C09K 8/22; C01B 32/23
See application file for complete search history.

(56) References Cited

U.S. PATENT DOCUMENTS

| 4,485,020 | A | 11/1984 | Shay et al. | |
|---|---|---|---|---|
| 2002/0155956 | A1 | 10/2002 | Chamberlain et al. | |
| 2012/0245058 | A1* | 9/2012 | Monteiro ............... | C09K 8/032 507/110 |
| 2017/0306127 | A1 | 10/2017 | Bocchini et al. | |
| 2017/0355798 | A1 | 12/2017 | Kundu et al. | |
| 2019/0315626 | A1 | 10/2019 | Park et al. | |

FOREIGN PATENT DOCUMENTS

| CN | 106117065 A | 11/2016 |
|---|---|---|
| CN | 107010621 A | 8/2017 |
| CN | 109135873 A | 1/2019 |
| CN | 109179397 A | 1/2019 |
| CN | 110078052 A | 8/2019 |
| CN | 110373165 | * 10/2019 |
| CN | 110373165 A | 10/2019 |
| WO | 2008097343 A2 | 8/2008 |
| WO | 2014089214 A2 | 6/2014 |
| WO | 2017058393 A1 | 4/2017 |

OTHER PUBLICATIONS

Yuxiu, An et al., "High-performance shale plugging agent based on chemically modified graphene", Journal of Natural Gas Science and Engineering, ScienceDirect, Elsevier B.V., vol. 32, Apr. 2016, pp. 347-355 (9 pages).
International Search Report issued in corresponding International Application No. PCT/US2020/026351, dated Nov. 2, 2020 (4 pages).
Written Opinion issued in corresponding International Application No. PCT/US2020/026351, dated Nov. 2, 2020 (7 pages).
Zhuang G, Zhang Z, Fu M, et al. "Comparative study on the use of cationic-nonionic-organo-montmorillonite in oil-based drilling fluids" Appl Clay Sci 116-117:257-262. https://doi.org/10.1016/j.clay.2015.04.004, 2015 (6 pages).
Moslemizadeh A, Shadizadeh SR "A natural dye in water-based drilling fluids: Swelling inhibitive characteristic and side effects" Petroleum 3:355-366. https://doi.org/10.1016/j.petlm.2016.08.007, 2017 (12 pages).
Boul PJ et al. "Functionalized Nanosilicas as Shale Inhibitors in Water-Based Drilling Fluids" SPE Drill Complet 32:121-130. https://doi.org/10.2118/185950-PA, 2017 (10 pages).
Su, Y. et al. "Impermeable barrier films and protective coatings based on reduced graphene oxide" Nat Commun 5:4843. https://doi.org/10.1038/ncomms5843, 2014 (5 pages).
Zhong, H. et al. "Bis(hexamethylene)triamine as Potential Shale Inhibitor in Water-Based Drilling Fluid" Open Pet Eng J 6:49-56. https://doi.org/10.2174/1874834101306010049, 2013 (8 pages).

* cited by examiner

*Primary Examiner* — Kumar R Bhushan
(74) *Attorney, Agent, or Firm* — Osha Bergman Watanabe & Burton LLP (57) ABSTRACT

A water-based wellbore fluid may include an aqueous base fluid and a modified graphene shale inhibitor that comprises one or more substituents that are covalently bonded to graphene via a linking group. One of the one or more substituents may be a hydrocarbon group that has a number of carbon atoms in the range from 8 to 14.

9 Claims, 8 Drawing Sheets

MODIFIED GRAPHENE SHALE INHIBITORS

BACKGROUND

A key challenge in oil and gas drilling operations is maintaining wellbore stability. A wellbore can become unstable by mechanical or chemical means. While the drilling operation itself can result in mechanical instability, the interaction between the drilling fluid system and the shale can cause chemical instability. Shale is composed of silicates and/or aluminosilicates and, importantly, clay minerals. When the shale encounters a water-based fluid, the active clay may adsorb water and swell. This swelling can result in wellbore instability that can, ultimately, lead to a stuck pipe, loss of drilling equipment, or abandonment of the well. Therefore, controlling and inhibiting shale swelling ("shale inhibition") is essential for successful drilling operations Improved shale inhibition is provided by the use of oil-based muds (OBMs), compared to water-based muds (WBMs), as they can plug pores and form a protective film around the shale to avoid hydration and swelling. However, due to environmental regulations and high costs, the application of OBMs is limited. Given the water-wet nature of WBMs, the long-term interaction of a WBM with shale provides a strong likelihood that water diffusion and swelling of shale will occur.

There are various kinds of shale inhibitors that can be included in WBMs to improve shale inhibition capacity, including inorganic salts (such as KCl), polymers, sugars and sugar derivatives, glycerols, and silicates. Most shale inhibitors function by viscosifying the water in the wellbore fluid, plugging the pores of the shale, or osmotically removing water from the shale. These additives are limited in that they generally do not efficiently inhibit shale hydration, while also contributing to negative environmental outcomes. In order to control the impact on the environment, improve the rheological features of drilling muds, and control the shale swelling, ester-based drilling muds, which tend to be biodegradable under both aerobic and non-aerobic conditions, have become more widely used.

Graphene is a widely explored material that has an atom-thick two-dimensional conjugated structure, a large surface area, and high conductivity. It is postulated that graphene may be useful in shale inhibition due to its flexible sheet-like structure, which could plug the shale surface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to water-based wellbore fluids that include an aqueous base fluid and a modified graphene shale inhibitor that comprises one or more substituents covalently bonded to graphene via a linking group. One of the one or more substituents may be a hydrocarbon group that has a number of carbon atoms in the range from 8 to 14.

In a further aspect, embodiments disclosed herein relate to methods of preparing a modified graphene shale inhibitor, the methods including preparing a carboxylic acid-containing graphene oxide by oxidizing graphite, reacting the carboxylic acid-containing graphene oxide with a halogenating agent to give an acyl halide-containing graphene, and reacting the acyl halide-containing graphene with a substituent-bearing compound to give the modified graphene shale inhibitor. The substituent-bearing compound may contain a hydrocarbon chain and one or more functional groups selected from the group consisting of carboxylic acids, alcohols, aldehydes, amines, amides, glycols, and silanes.

Other aspects and advantages of the claimed subject matter will be apparent from the following description and the appended claims.

DETAILED DESCRIPTION

Embodiments in accordance with the present disclosure generally relate to modified graphene shale inhibitors, their preparation, and their use in wellbore fluids. Generally, the modified graphene shale inhibitors of embodiments disclosed herein comprise a graphene that is covalently bonded to one or more substituents via a linking group.

The suitability of a wellbore fluid for its use in a given application is significantly determined by its rheological properties, including its apparent viscosity, plastic viscosity, gel strength, and yield point. These properties may be altered in esters, for example, by variation of the substituents situated on either side of the ester functional group. The present disclosure combines the sheet-like structure of graphene with the biodegradability and rheological benefits that are provided by esters.

In one embodiment of the present disclosure, the modified graphene shale inhibitors may provide an effective barrier to large ionic movement into the shales, while allowing water movement, thus forming an osmotic barrier which may allow for the stabilization of the shales.

Modified Graphene Shale Inhibitors
Composition

Graphene is a single graphite sheet that is at most about 100 carbon layers thick, and, in many cases, less than about 10 carbon layers thick. "Graphene" and "graphene sheets" are terms that may be used equivalently in the present disclosure. In one or more embodiments, the modified graphene shale inhibitors comprise functionalized graphene, that is, graphene that is functionalized with one or more functional groups.

The graphene of one or more embodiments can be provided by any synthetic method known to one of ordinary skill in the art, including mechanical exfoliation, chemical vapor deposition, and chemical reaction. In one or more embodiments, the graphene may be prepared from waste graphite.

The graphene sheets of one or more embodiments may have a dimension that ranges from about 100 nm to about 1 mm in length. For example, the graphene sheets may have a dimension that is of a length ranging from a lower limit of any of 0.1, 0.25, 0.5, 1.0, 5.0, 10, 50, 100, 250 and 500 μm to an upper limit of any of 1.0, 5.0, 10, 25, 50, 100, 200, 300, 500, 750, and 1000 μm, where any lower limit can be used in combination with any mathematically-compatible upper limit. In one or more embodiments, the graphene may be selected as to have a size that is suitable for plugging the shale pores of a subterranean formation.

In one or more embodiments, modified graphene shale inhibitors in accordance with the present disclosure may contain a graphene sheet that is covalently bonded to one or more functional groups (or "substituents"). The substituents of one or more embodiments may be bonded to the graphene sheet via a linking group.

In one or more embodiments, the linking group that connects a substituent to the graphene sheet may be selected from the group consisting of an ester, an acid anhydride, an amide, an amine, an ether, a thioether, and a thioester. The linking group of particular embodiments may be an ester. One of ordinary skill in the art would appreciate, with the benefit of this disclosure, that the selection of a linking group may affect the properties of the modified graphene shale inhibitor. For instance, the ability of a linking group to participate in hydrogen bonding generally increases the water-solubility of the shale inhibitor.

The substituent of one or more embodiments may be one or more of an alkyl group, an alkenyl group, an alkynyl group, an ether, a ketone, a thioether, an amine, an alcohol, and a thiol. In particular embodiments, the substituents may be a hydrocarbon group, such as an alkyl or alkenyl group that is either linear or branched.

In one or more embodiments, the substituent may contain a number of carbons ranging from 8 to 15. For example, substituent may contain a number of carbons ranging from a lower limit of any of 8, 9, 10, 11, and 12 to an upper limit of any of 10, 11, 12, 13, 14, and 15 where any lower limit can be used in combination with any mathematically-compatible upper limit. In particular embodiments, the substituent may contain a $C_{11}$ alkyl group, such as undecanecarboxylate.

In one or more embodiments, the modified graphene shale inhibitor may contain one or more substituents. In further embodiments, the modified graphene shale inhibitor may comprise a plurality of substituents. The modified graphene shale inhibitor of one or more embodiments may contain the substituents in an amount that ranges from about 1 to 80% by weight (wt. %). For example, the graphene sheets may have substituent content ranging from a lower limit of any of 1, 5, 10, 20, 30, 40, 50, 60, and 70 wt. % to an upper limit of any of 5, 10, 20, 30, 40, 50, 60, 70, and 80 wt. %, where any lower limit can be used in combination with any mathematically-compatible upper limit.

The modified graphene shale inhibitor of one or more embodiments may include one or more types of substituents. In some embodiments, the modified graphene shale inhibitor may comprise two or three different substituents. The different substituents may be included in different amounts or in equimolar amounts.

Synthesis

In the preparation of the modified graphene shale inhibitors of the present disclosure, graphite may be oxidized to provide graphene oxide. Graphene oxide is a graphene sheet that contains one or more oxygen-containing groups. In one or more embodiments, graphene oxide may include one or more carboxylic acid groups, hydroxyl groups, and epoxy bridges. The exact chemical structure of graphene oxide is dependent upon its method of synthesis.

The oxidation of graphene can be performed by many reagents, including Hummers' method, which uses a mixture of sulphuric acid, sodium nitrate and potassium permanganate. In particular embodiments of the present disclosure, the graphene oxide may be prepared by the addition of sodium nitrate and an oxidizing agent, such as sodium persulfate, to graphite. In some embodiments, the sodium nitrate may be added to the graphite with stirring in an ice bath. The oxidizing agent may be added to the cooled sodium nitrate and graphite mixture in more than one aliquot. Water may be added in a dropwise manner to the mixture, which may then be heated to a temperature of 90° C. The mixture may then be cooled to room temperature. Subsequent addition of hydrogen peroxide, and centrifugation, may yield the graphene oxide. The centrifugation of one or more embodiments may be performed at 10,000 rpm. The obtained graphene oxide may be further acidified (with, for instance, nitric acid) to provide a carboxylic acid-containing graphene oxide.

Though graphene oxide may already contain hydroxyl, carboxylic acid, and epoxy groups, the graphene oxide of one or more embodiments may be further reacted to include a functional group that can be appropriately reacted with a substituent-bearing compound. Such functional groups may be selected from the group consisting of acyl chlorides, carboxylic acids, hydroxyl groups, aldehydes, amines, amides, glycols, silanes, and derivatives thereof.

Figure 1:
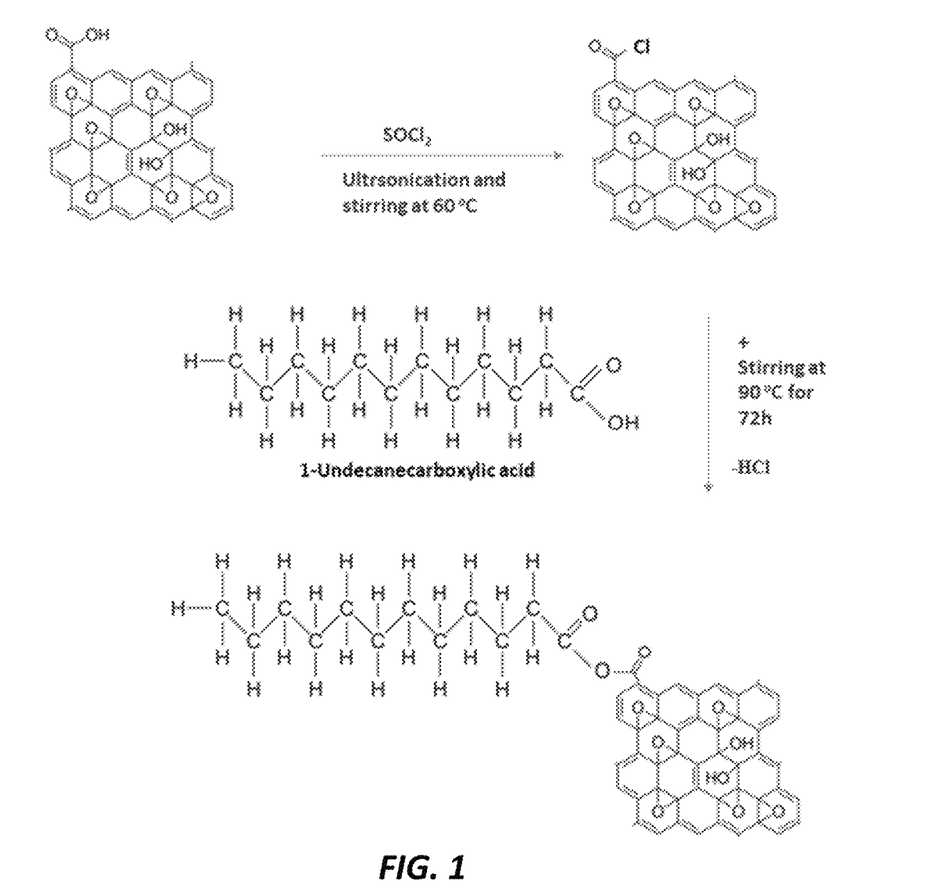
FIG. 1 is a schematic depiction of a synthesis of a modified graphene shale inhibitor of one or more embodiments of the present disclosure.

In one or more embodiments, the graphene oxide may be reacted with a halogenating agent to convert the carboxylic acid groups of the graphene oxide to acyl halides. As illustrated in FIG. 1, in one or more embodiments a chlorinating agent, such as thionyl chloride ($SOCl_2$), may be used to provide a modified graphene that contains acyl chloride functional groups. The halogenation of one or more embodiments may be performed under reflux conditions. The halogenation may be performed for 8 hours or more, 12 hours or more, or 24 hours or more. In some embodiments, after halogenation the mixture may be cooled to room temperature and any residual halogenating agent may be removed by reduced pressure distillation to yield an acyl-chloride functionalized graphene.

The acyl-chloride functionalized graphene may be added to an organic solvent, such as chloroform, and the mixture may be sonicated to create a homogeneous dispersion. The sonicating may be performed for 5 minutes or more, 10 minutes or more, or 20 minutes or more.

In one or more embodiments, substituents may be introduced to the graphene oxide (or functionalized derivative thereof) by a reaction type that is highly dependent on the exact nature of the reactive species involved. For example, the modified graphene shale inhibitor may be prepared by esterification, etherification, nucleophilic addition, electrophilic addition, radical addition, dipolar addition, Diels-Alder addition, among others.

The substituents of one or more embodiments may be introduced by a substituent-bearing compound. The substituent-bearing compound may contain the substituent and one or more functional groups to enable formation of the linker and covalent attachment to the graphene. The functional groups of one or more embodiments may be selected from the group consisting of acyl chlorides, carboxylic acids, hydroxyl groups, aldehydes, amines, amides, glycols, silanes, and derivatives thereof.

As depicted in FIG. 1, in particular embodiments a modified graphene shale inhibitor may be prepared by reacting an acyl chloride-containing graphene with an alkylcarboxylic acid. The alkylcarboxylic acid of one or more embodiments may contain 8 to 15 carbon atoms Wellbore Fluids The wellbore fluids of one or more embodiments of the present disclosure may include, for example, water-based wellbore fluids, invert emulsion wellbore fluids, and oil-based wellbore fluids. The wellbore fluids may be drilling fluids, such as water-based drilling muds (WBMs), or completion fluids, among others.

Compositions

Water-based wellbore fluids of one or more embodiments may have an aqueous base fluid. The aqueous fluid may include at least one of fresh water, seawater, brine, water-soluble organic compounds, and mixtures thereof. The aqueous fluid may be fresh water that is formulated to contain various salts. The salts may include, but are not limited to, alkali metal halides and hydroxides. In one or more embodiments of the wellbore fluid disclosed herein, brine may be any of seawater, aqueous solutions wherein the salt concentration is less than that of sea water, or aqueous solutions wherein the salt concentration is greater than that of sea water. Salts that may be found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the wellbore fluid may be controlled by increasing the salt concentration in the brine, though the maximum concentration is determined by the solubility of the salt. In particular embodiments, brine may include an alkali metal halide or carboxylate salt and/or alkaline earth metal carboxylate salts.

Oil-based wellbore fluids of one or more embodiments may have an oleaginous base fluid. The oleaginous fluid may be a natural or synthetic oil. In one or more embodiments, the oleaginous fluid may be one or more of diesel oil, mineral oil, polyalphaolefins, siloxanes, organosiloxanes, fatty acid esters, and mixtures thereof.

Wellbore fluids of one or more embodiments may be invert emulsions that have an oleaginous external phase and a non-oleaginous internal phase. The invert emulsion of one or more embodiments may contain a volume ratio of the oleaginous phase to the non-oleaginous phase ranging from about 1:99 to 60:40. For example, the invert emulsion may have a volume ratio of the oleaginous phase to the non-oleaginous phase ranging from a lower limit of any of 1:99, 10:90, 20:80, 30:70, and 40:60 to an upper limit of any 20:80, 30:70. 40:60:50:50, and 60:40, where any lower limit can be used in combination with any mathematically-compatible upper limit. The oleaginous external phase may be any of those detailed above with respect to the oil-based wellbore fluids. The aqueous liquid may be any of those detailed above with respect to the water-based wellbore fluids.

The wellbore fluid of one or more embodiments may comprise a modified graphene shale inhibitor in an amount ranging from about 0.2 to 5% by weight (wt. %). For example, the wellbore fluid may contain the modified graphene shale inhibitor in an amount ranging from a lower limit of any of 0.2, 0.3, 0.5, 0.7, 0.8, 1.0, 1.5, 2.0, and 2.5 wt. % to an upper limit of any of 0.5, 0.8, 0.9, 1.0, 1.5, 2.0, 2.5, 3.0, 3.5, and 5.0 wt. %, where any lower limit can be used in combination with any mathematically-compatible upper limit. In particular embodiments, the wellbore fluid may contain the inhibitor in an amount of about 0.5 to 1.5 wt. %.

Further, other additives may be included in the wellbore fluids of the present disclosure. Such additives may include, for instance, one or more of the group consisting of weighting agents, viscosifiers, wetting agents, corrosion inhibitors, oxygen scavengers, anti-oxidants, biocides, surfactants, dispersants, interfacial tension reducers, pH buffers, mutual solvents and thinning agents. Weighting agents suitable for use in the wellbore fluids of one or more embodiments include, for example, bentonite, barite, dolomite, calcite, and the like. The identities and use of the aforementioned additives are not particularly limited. One of ordinary skill in the art will, with the benefit of this disclosure, appreciate that the inclusion of a particular additive will depend upon the desired application, and properties, of a given wellbore fluid. For instance, a wellbore fluid of one or more embodiments that is a completion fluid, may comprise a breaker for breaking a filter cake.

Properties

The rheological features of a wellbore fluid are important in determining the suitability of the fluid for a given application.

The wellbore fluid of one or more embodiments may have a density that is greater than 60 lb/ft$^3$. For example, the wellbore fluid may have a density that is of an amount ranging from a lower limit of any of 60, 62, 64, 66, 68, 70, 75, and 80 lb/ft$^3$ to an upper limit of any of 66, 68, 70, 75, 80, 90, and 100 lb/ft$^3$, where any lower limit can be used in combination with any mathematically-compatible upper limit.

The apparent viscosity of a fluid is directly related to the swelling rate of the fluid in the presence of an inhibition medium. Therefore, a low apparent viscosity demonstrates that the fluid may have a low interaction with clay. The wellbore fluid of one or more embodiments may have an apparent viscosity ranging from about 10 to 35 cP. For example, the wellbore fluid may have an apparent viscosity that ranges from a lower limit of any of 10, 12, 14, 16, 18, 20, and 22 cP to an upper limit of any of 18, 20, 22, 25, 30, and 35 cP, where any lower limit can be used in combination with any mathematically-compatible upper limit.

The plastic viscosity of a fluid is a measure of the resistance of the fluid to flow. For instance, drilling fluids that have a lower plastic viscosity have the capacity to drill more quickly. Plastic viscosity is dependent on both the solid content of a fluid and temperature. The wellbore fluid of one or more embodiments may have a plastic viscosity ranging from about 1 to 25 cP. For example, the wellbore fluid may have a plastic viscosity that ranges from a lower limit of any of 1, 3, 5, 7, 9, and 10 cP to an upper limit of any of 11, 13, 15, 20, and 25 cP, where any lower limit can be used in combination with any mathematically-compatible upper limit.

The wellbore fluid of one or more embodiments may have an initial gel strength, after 10 seconds, ranging from about 5 to 20 lb/100 ft$^2$. For example, the wellbore fluid may have an initial gel strength that ranges from a lower limit of any of 5, 6, 7, 8, and 10 lb/100 ft$^2$ to an upper limit of any of 9, 10, 12, 15, and 20 lb/100 ft$^2$, where any lower limit can be used in combination with any mathematically-compatible upper limit.

The wellbore fluid of one or more embodiments may have a final gel strength, after 10 minutes, ranging from about 10 to 35 lb/100 ft$^2$. For example, the wellbore fluid may have a final gel strength that ranges from a lower limit of any of 10, 12, 14, 16, 18, 20, and 25 lb/100 ft$^2$ to an upper limit of any of 15, 18, 20, 25, 30, and 35 lb/100 ft$^2$, where any lower limit can be used in combination with any mathematically-compatible upper limit.

The yield point is the resistance of a fluid to initiate movement and is an assessment of the strength of the attractive forces between the colloidal particles of the fluid. The yield point, for instance, demonstrates the capability of a drilling fluid to raise shale cuttings out of a borehole under dynamic conditions. A fluid with a higher yield point provides better carrying capacity as compared to a fluid with similar density and lower yield point. The wellbore fluid of one or more embodiments may have a yield point ranging from about 2 to 15 Pa. For example, the wellbore fluid may have a plastic viscosity that ranges from a lower limit of any of 2, 5, 6, and 7 to an upper limit of any of 7, 8, 10, 12 and 15 Pa, where any lower limit can be used in combination with any mathematically-compatible upper limit.

Figure 2:
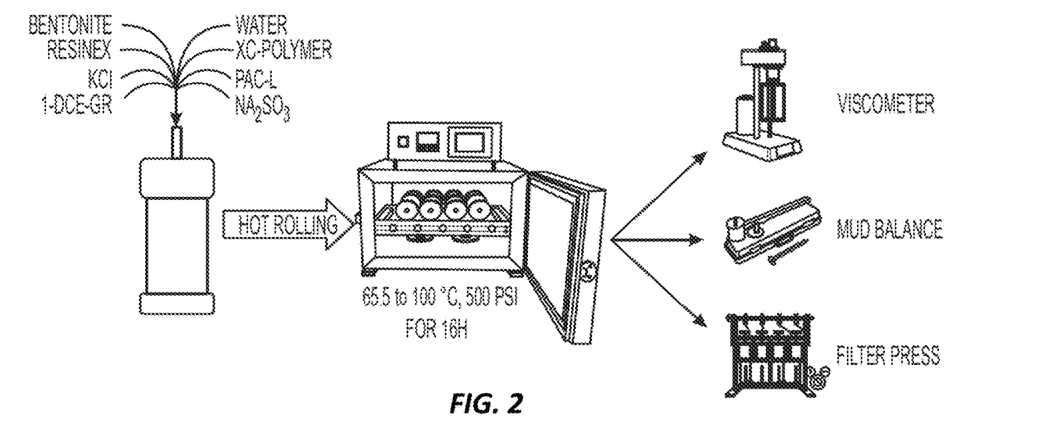
FIG. 2 is a schematic representation of mud making and fluid loss tests in accordance with the present disclosure.

Rheological features such as apparent viscosity, plastic viscosity, initial gel strength, final gel strength. and yield point (YP) can be determined for a wellbore fluid after hot-rolling at, for instance, 65.5° C. for 16 h under 500 psi pressure. The values were obtained from a model 35A viscometer (FANN instrument company, Houston, USA) at dial readings of 600 rpm and 300 rpm by the standard procedure for assessment as shown in FIG. 2. To measure the initial and final gel strength of a wellbore fluid, a viscometer can be operated at 600 rpm for 10 s and then switched off for 10 s and 10 min, respectively. Afterward, the viscometer can be turned to a revolution speed of 3 rpm.

A dispersion test evaluates the fragmentation and attrition of a shale material when exposed to a fluid. The shale composition, shale brittleness, degree of hydration and stresses around the borehole are the crucial factors that prominently affect the dispersion of shale. The wellbore fluid of one or more embodiments may have a rolling recovery of shale cuttings of greater than 80%, greater than 85%, or greater than 90%. The recovery of shale may be determined by adding shale cuttings to the wellbore fluid and hot-rolling at 25 rpm and 66° C. for 16 h in a rolling oven. After cooling, the shale cuttings can be separated from the fluid by sieving and then washed with water. After drying, the cuttings can be weighed and a % recovery can be calculated.

However, the dispersion test is unable to predict the long-term stability of the inhibited shale. A shale inhibition durability test can help to analyze the consequence of reactive components of the drilling mud to cope with time-dependent borehole stability issues. The wellbore fluid of one or more embodiments may have an inhibition durability recovery of greater than 85%, greater than 90%, or greater than 95% after 6 hours. The wellbore fluid of one or more embodiments may have an inhibition durability recovery of greater than 40%, greater than 45%, or greater than 50% after 24 hours. The inhibition durability can be determined by using already inhibited shale cuttings recovered from a dispersion test. The inhibited shale cuttings can be added to water and aged for a determined amount of time. After cooling the shale cuttings can be separated from the fluid by sieving and then washed with water. After drying, the cuttings can be weighed and a % recovery can be calculated.

The wellbore fluid of one or more embodiments may have a fluid loss of less than 8 mL. For example, the wellbore fluid may have a fluid loss that ranges from a lower limit of any of 1, 2, 3, 4, 5, and 6 mL to an upper limit of any of 6, 7, 8, 9, and 10 mL, where any lower limit can be used in combination with any mathematically-compatible upper limit. The fluid loss may be determined at a pressure of 100 psi according to the standard procedure as shown in FIG. 2.

Methods

Wellbore fluids of one or more embodiments may be circulated into a wellbore or subterranean formation using techniques known to a person of ordinary skill in the art. The wellbore fluids of one or more embodiments may be used as one or more of a drilling or drill-in fluid during the drilling of a wellbore, as a completion fluid for the completion of a wellbore after drilling is completed, and a workover fluid that is used for well workover.

EXAMPLES

The following examples are merely illustrative and should not be interpreted as limiting the scope of the present disclosure.

Materials and Synthesis:

In order to compare the swelling inhibition performance of the modified graphene shale inhibitors, KCl was used as a comparative example and purchased from Beantown chemicals, Hudson, USA. Various common additives were utilized to formulate a synthetic water-based mud. The bentonite was employed to assess the inhibitive operation of the modified WBM and was obtained from the Delmon group of companies, Al Khobar, KSA. Resinex, Xanthan gum (XC) biopolymer, and poly aluminum chloride (PAC-L) were acquired from Haliburton, Houston, USA. Sodium sulfite was purchased from Sigma Aldrich (USA). Fresh tap water was utilized in all experiments. Shale cuttings were collected from an Aramco drilling site.

Graphene oxide was synthesized from waste graphite. About 20 g of graphite and 6 g of sodium nitrate (NaNO$_3$) were introduced in a 1 L round-bottom flask with stirring in an ice bath. About 10 g of sodium persulfate was introduced in multiple aliquots, under continuous stirring. After 8 h under stirring, 0.2 L of distilled water was introduced dropwise and the mixture was stood for 24 h at 90° C. After cooling, H$_2$O$_2$ (30%) was added dropwise until the solution turned a brown-yellow color. The contents of the flask were stirred for a further 3 h without heating. The suspension was centrifuged at 10,000 rpm to obtain graphene oxide. The obtained graphene was further treated with nitric acid to create carboxylic groups on the graphene nanosheets.

Thionyl chloride (SOCl$_2$) was added to the carboxylic-functionalized graphene and allowed to react for 24 h under reflux at 60° C. After cooling, the residual SOCl$_2$ was removed by reduced pressure distillation to yield the acyl-chloride functionalized graphene. The obtained material was added to chloroform, and the mixture was sonicated for 20 min to create a homogeneous dispersion into which 1-undecanecarboxylic acid (C$_{12}$H$_{24}$O$_2$) was added under nitrogen flow. The mixture was kept under stirring with reflux at 80° C. for 24 h. The obtained undecanecarboxylate-modified graphene (hereafter "1-DEC-Gr") was separated and allowed to dry.

Material Characterization:

Field emission scanning electron microscopy (FE-SEM, performed with a TESCAN Lyra3) was used to characterize the surface characteristic of the shale, 1-DEC-Gr, and shale modified with 1-DEC-Gr. To confirm the existence of carbon, silicon, and nitrogen on the surface of prepared materials, energy-dispersive X-ray spectroscopy (EDX) scan was also performed. X-ray photoelectron spectroscopy (V.G. Scientific ESCALAB Mk (II) spectrometer using a non-monochromatic Al source (K$\alpha$, 1486.6 eV)) was used to confirm the existence of elements on the sorbent surface.

Methods:

In order to test the various features of the shale inhibitor, the water-based mud (WBM) was prepared by utilizing the components mentioned in Table 1.

TABLE 1

Composition of drilling muds

| Formulation | Traditional drilling mud | Modified drilling mud |
|---|---|---|
| Water (ml) | 281.4 | 281.4 |
| Bentonite (g) | 5 | 5 |
| XC-polymer (g) | 0.8 | 0.8 |
| Resinex (g) | 4.5 | 4.5 |
| PAC-L (g) | 1.5 | 1.5 |
| KCl (g) | 29 | 29 |
| Sodium sulfite (g) | 0.3 | 0.3 |
| 1-DCE-Gr (g) | 0 | 3 |

A model 35A viscometer (FANN instrument company, Houston, USA) was utilized for the rheology testing of the unmodified and modified muds. For this purpose, 350 mL of the WBM was prepared containing 5 g of bentonite, various concentrations of surfactants, 3 g shale inhibitor, and was mixed for 30 min. The dispersion was hot rolled at 65.5° C. for 16 h under 500 psi pressure. After hot rolling, the drilling mud was cooled to room temperature and the rheological features such as apparent viscosity (AV), plastic viscosity (PV) and yield point (YP) were estimated by using the values obtained from the viscometer at dial readings of 600 rpm and 300 rpm and the formulae of Table 2. These values were obtained by the standard procedure for assessment as shown in FIG. 2.

TABLE 2

Rheological properties obtained

| Property | Description | Units | |
|---|---|---|---|
| Apparent viscosity (AV) | $\theta_{600}/2$ | cP | 1 cP = 1 mPa s |
| Plastic viscosity (PV) | $\theta_{600} - \theta_{300}$ | cP | |
| Initial gel (IG) | $\theta_3$ after 10 s | lb/100 ft$^2$ | lb/100 ft$^2$ = 0.48 Pa |
| Final gel (FG) | $\theta_3$ after 10 min | lb/100 ft$^2$ | |
| Yield point (YP) | $\theta_{300}$ − PV | lb/100 ft$^2$ | |

$\theta_a$ is the dial reading at a specific RPM. To measure the initial and final gel strength of the WBM, the viscometer was operated at 600 rpm for 10 s and then switched off for 10 s and 10 min, respectively. Afterward, the viscometer was turned to a revolution speed of 3 rpm, the extreme dial reading was noted as the 10-min gel strength in pounds per 100 ft$^2$.

A mud balance (OFI Testing Equipment, Inc., Houston, USA) was employed for determining the density of the bentonite-based inhibitive mud. For this purpose, 350 ml of the WBM was prepared containing 5 g of bentonite, various concentrations of surfactants, 3 g shale inhibitor, and was mixed for 30 min. The dispersion was hot rolled at 65.5° C. for 16 h under 500 psi pressure. After hot rolling, the drilling mud was cooled to room temperature and the density measured. The rheological properties of the WBM were estimated before and after hot rolling to compare the effect of temperature and pressure.

The fluid loss testing was performed with a water loss press unit (OFI Testing Equipment, Inc., Houston, USA). A bentonite-based drilling mud was prepared by adding bentonite, along with various additives, to water. The WBM was mixed for the 30 min and then the amount of fluid loss was measured by a pressure of 100 psi according to the standard procedure as shown in FIG. 2. The fluid loss of the WBM was estimated before and after hot rolling to compare the effect of temperature and pressure.

Figure 3:
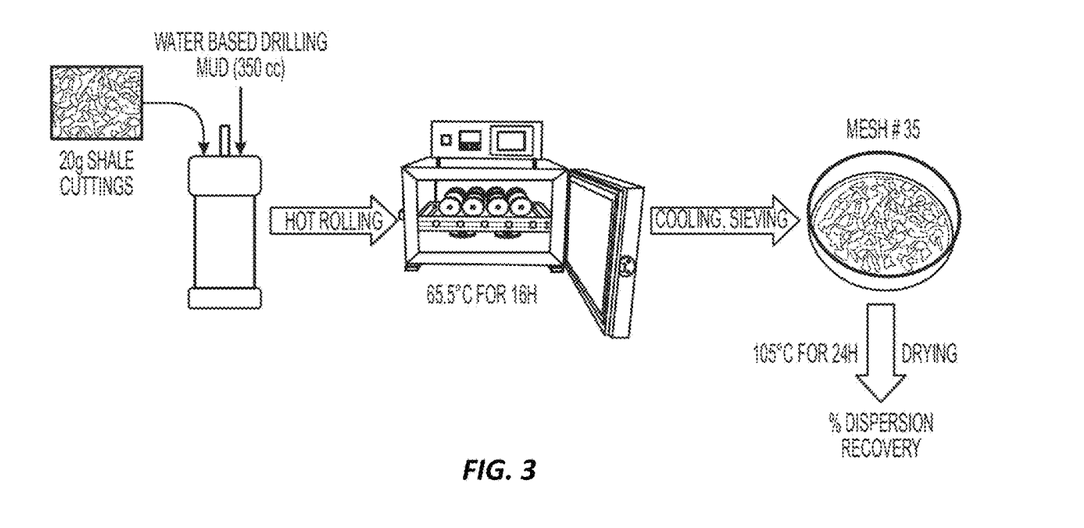
FIG. 3 is a schematic representation of a dispersion test in accordance with the present disclosure.

Firstly, the shale was crumpled and sorted by a sieve shaker (W. S. Tyler Mentor, Ohio, USA) between mesh no. 10 and no. 5. In order to measure the dispersion of shale, 20 g of the shale cuttings were added to 350 ml of WBM, with and without shale inhibitor. The aging cell was hot rolled at 25 rpm and 66° C. for 16 h in the rolling oven (OFI Testing Equipment, Inc., Houston, USA) to mimic a borehole environment. Afterward, the cell was cooled to room temperature. The shale cuttings were sieved with mesh no. 35 and then washed thoroughly with running water to remove the small shale particles. The shale cuttings on the sieve were desiccated at 105° C. for 24 h as shown in FIG. 3. Lastly, the cuttings were weighed and the % recovery was calculated by using the following equation:

$$\text{shale dispersion recovery} = W_c/20 \times 100$$

where $W_c$ is the weight of the remaining shale cuttings after dispersion test.

Figure 4:
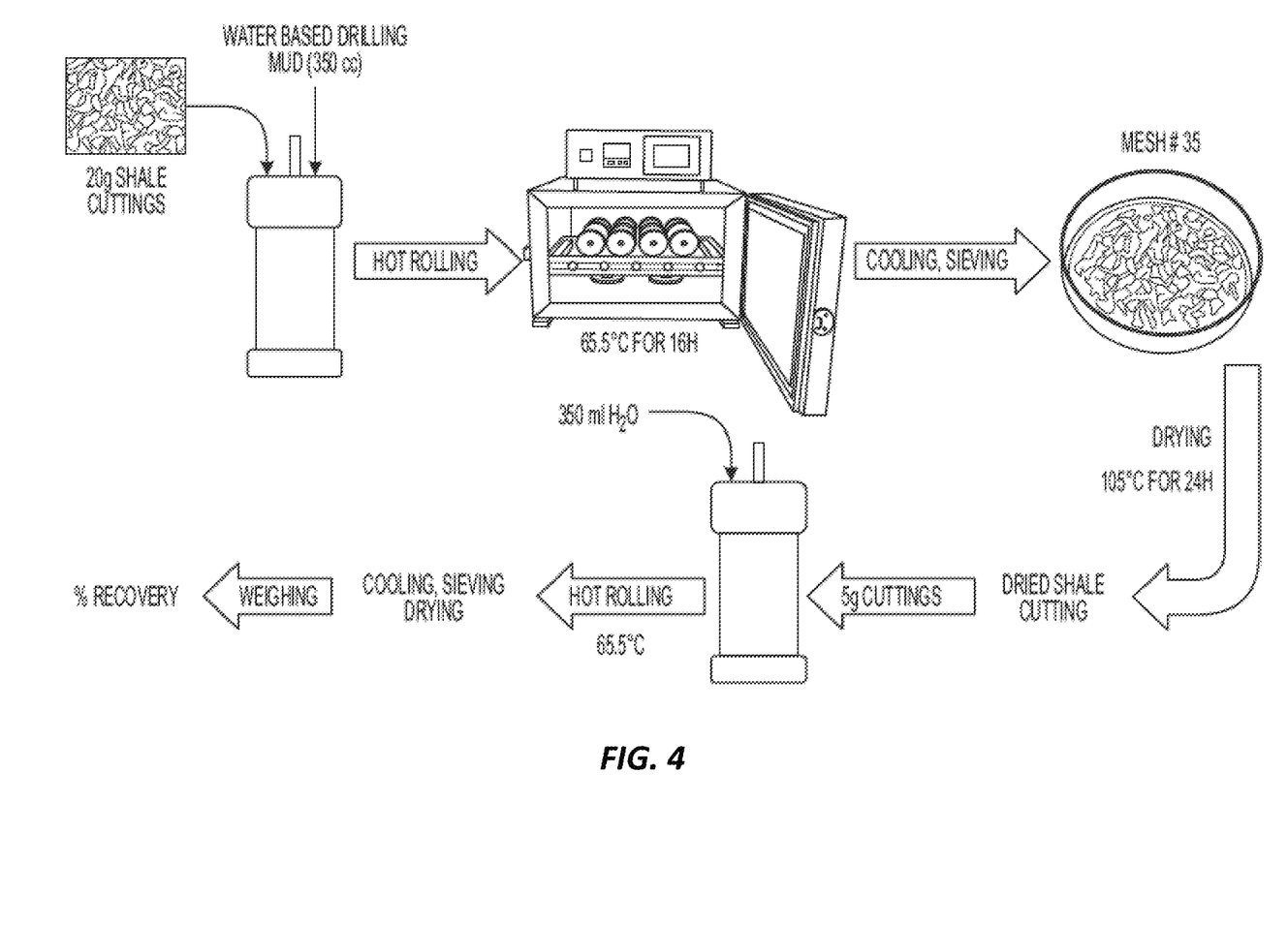
FIG. 4 is a schematic representation of an inhibition stability test in accordance with the present disclosure.

Evaluation of the inhibition durability allows one to select a shale inhibitor with better efficiency in preserving the shale integrity, enabling borehole instability problems to be reduced. The test is performed by utilizing the already inhibited shale cuttings that were recovered from the dispersion tests. The fresh water is utilized as a highly reactive medium to assess the stability of the inhibition of shale cuttings. 5 g of the inhibited shale cuttings were added to the aging cell containing 350 mL fresh water. The hot rolling of the aging cell was performed for various periods of time. After, the aging cell was cooled to ambient temperature and the content of the cell poured into a sieve with mesh no. 35. The shale cuttings in the sieve were rinsed with water and then placed in an oven at 105° C. for 24 h. A schematic diagram of the inhibition stability test is shown in FIG. 4. Afterward, the mass of the shale cuttings was measured to calculate the % recovery by utilizing the equation:

$$\text{shale inhibition durability recovery} = W_i/5 \times 100$$

where $W_i$ is the weight of the remaining shale cutting after the hot rolling in the water.

The interaction of the aqueous medium with and without shale inhibitor was demonstrated by measuring the linear swelling by using a Dynamic Linear Swellmeter (OFI Testing Equipment, Inc., Houston, USA). For this purpose, 15 g of the clay powder was placed in a hydraulic cylinder compressor and 8000 psi pressure was applied for 2 h. Afterward, the clay specimens were immersed in one of water, an aqueous solution of KCl, and shale inhibitors. Samples were observed for 24 h to measure the % swelling.

Figure 5A:
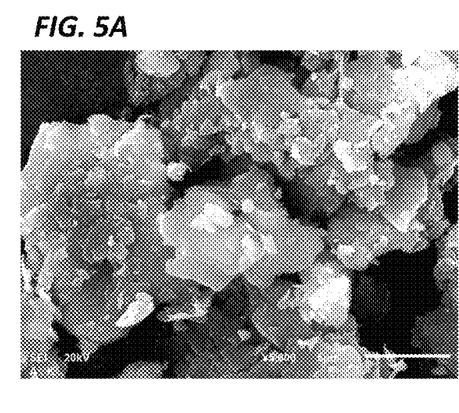
FIGS. 5A-D depict SEM images of shale (5A) and shale modified with a undecanecarboxylic graphene shale inhibitor (1-DEC-GR) of one or more embodiments (5B), and EDX spectra of shale (5C) and shale modified with 1-DEC-GR (5D).
Figure 5B:
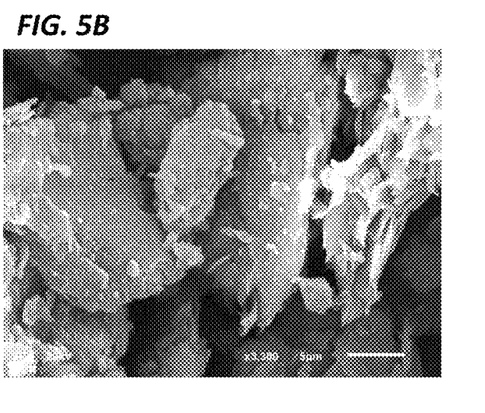
Figure 5C:
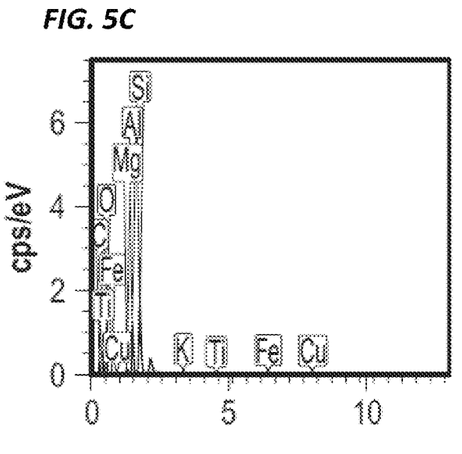
Figure 5D:
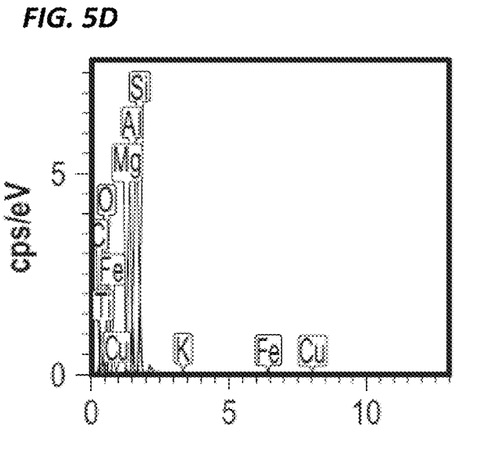

It is postulated that the 1-DEC-Gr can advantageously plug the apertures on the shale surface. With the positive differential pressure between the drilling fluid and shale formation, the 1-DEC-Gr is pushed close to the wellbore boundary, blocking the pores on the shale surface. FIG. 5A is an SEM image of the original shale surface, where the pores are visible. Once the surface of shale is treated with 1-DEC-Gr, the unseamed surface appears in a SEM micrograph (FIG. 5B). The 1-DEC-Gr covers the nanopores on the surface of shale, reducing the interaction between the water and the shale and resulting in decreased fluid loss. The EDX of the shale material demonstrates that it contains a significant amount of oxygen, silicon, aluminum, carbon, and iron with weight % of 41.06, 16.89, 10.05, 25.52 and 3.92, respectively (FIG. 5C). When the shale sample was treated with 1-DEC-Gr, a prominent variation in composition was observed. The 1-DEC-Gr modified shale contains oxygen, silicon, aluminum, carbon, and iron weight % of 31.18, 8.41, 5.10, 48.71, and 3.48, respectively (FIG. 5D). These findings confirm that carbon content is introduced to the shale structure and reducing the silicon %.

Figure 6:
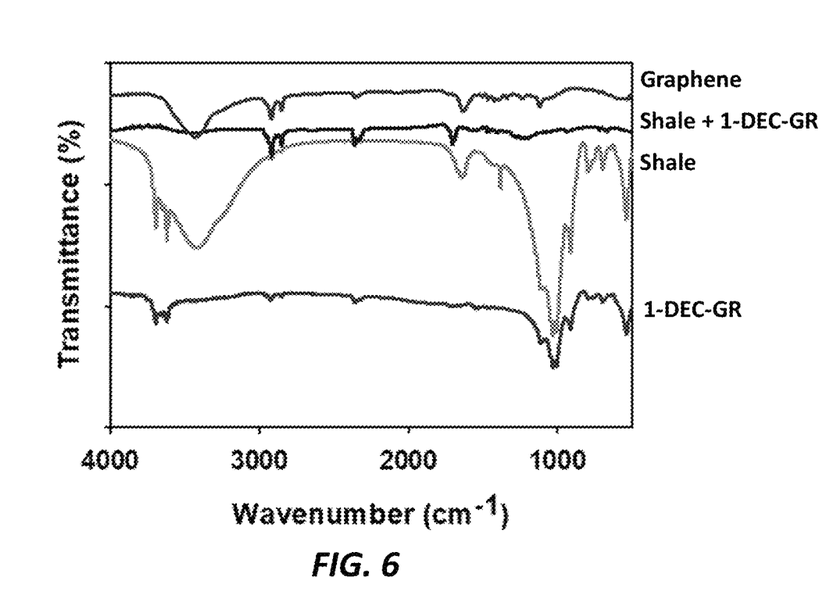
FIG. 6 depicts FT-IR spectra of shale, 1-DEC-GR, shale plus 1-DEC-GR, and graphene.

FIG. 6 depicts the FTIR spectra of graphene (Gr), 1-DEC-Gr, shale, and 1-DEC-Gr modified shale. In the FTIR spectra of graphene, two prominent bands appear at 2846 and 2916 $cm^{-1}$ that are attributed to the symmetric and asymmetric stretching of —$CH_2$— groups. The bands at 1408 and 1465 $cm^{-1}$ can be accredited to deformative vibrations of —$CH_2$— groups. A characteristic stretching vibration peak of hydroxyl group appears at 3430 $cm^{-1}$. The sharp peak at 1608 $cm^{-1}$ can be accredited to the C=C stretching vibration. The FTIR spectra of 1-DEC-Gr indicates that the 1-DEC modification of the surface of graphene can be observed. In FIG. 6, it is shown that the broad peak due to —OH stretching vibration almost disappears due to functionalization by 1-DEC. The absorbance peak at 1220 $cm^{-1}$ is the result of the epoxy stretching vibrations. The FTIR spectra also display an absorption band in the section of 2355 $cm^{-1}$ that can be accredited to $CO_2$ absorbed from the surrounding environment.

The FTIR spectra of shale material exhibits the strong characteristic peaks of a OH group at 3416 and 3606 $cm^{-1}$. The angular vibration of OH groups of adsorbed water in shale give rise to the absorption band at 1640 $cm^{-1}$. The bands at 1110 and 1030 $cm^{-1}$ arise due to Si—O stretching of the clay and the absorption bands at 915 and 791 $cm^{-1}$ are due to octahedral layers of aluminosilicates. The band at 693 $cm^{-1}$ was due to the Si—O—Al bending in the aluminosilicate minerals. The FTIR spectra of the shale material match that of kaolinite, suggesting that the shale is formed from kaolinite. When 1-DEC-Gr was added to the shale sample, the shale inhibitor interacted with the shale surface and plugged the nanopores. The FTIR spectrum of 1-DEC-Gr modified shale demonstrates all the characteristics of the clay. However, the broad peak due to OH stretching at 3416 $cm^{-1}$ was prominently reduced. The peak at 1640 $cm^{-1}$ that arises due to adsorbed water was also reduced, confirming that the attachment of 1-DEC-Gr to shale induces hydrophobicity.

Figure 7:
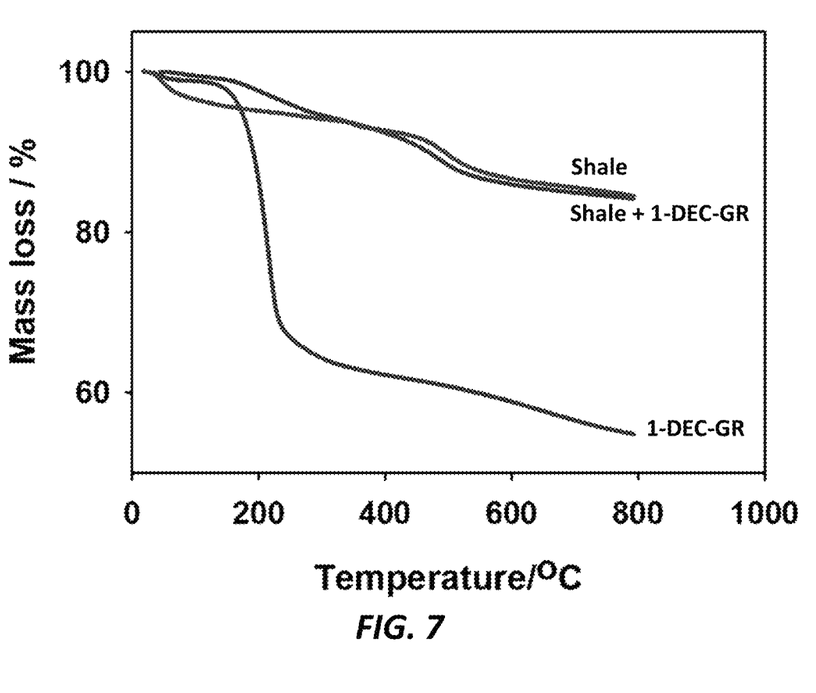
FIG. 7 depicts a thermogravimetric analysis of 1-DEC-GR, shale plus 1-DEC-GR, and shale.

FIG. 7 depicts a thermogravimetric analysis. 1-DEC-Gr demonstrates a significant weight loss that can be ascribed to the elimination of adsorbed water from the graphene surface due to intercalation between graphene and 1-DEC. However, once 200° C. is reached, there is a sharp mass loss in the 1-DEC-Gr that can be accredited to the decomposition of oxygen-containing functional groups. Afterward, relatively gradual mass loss is observed between 200-800° C. Finally, a total residue amount of 45% was obtained from 1-DEC-Gr.

There are several mass loss steps involved in the decomposition of the shale material, such as water desorption and dehydration followed by the disintegration of organic matter and, finally, dihydroxylation of the clay minerals. The mass loss before 200° C. can be accredited to the dehydration of the shale, which is important in determining the clay reactivity. FIG. 7 shows that, from ambient temperature to 200° C., the mass loss in the shale sample was 4.9%. On the other hand, 1-DEC-Gr modified shale demonstrated just 2.0% mass loss, which was much lower as compared to the unmodified shale material. The difference in the % water loss confirms the intercalation of the 1-DEC-Gr with shale that makes the surface hydrophobic and reduces the water content. At temperatures of 200 to 800° C., the shale and 1-DEC-Gr modified shale display same mass loss, i.e. 15.5%.

Figure 8:
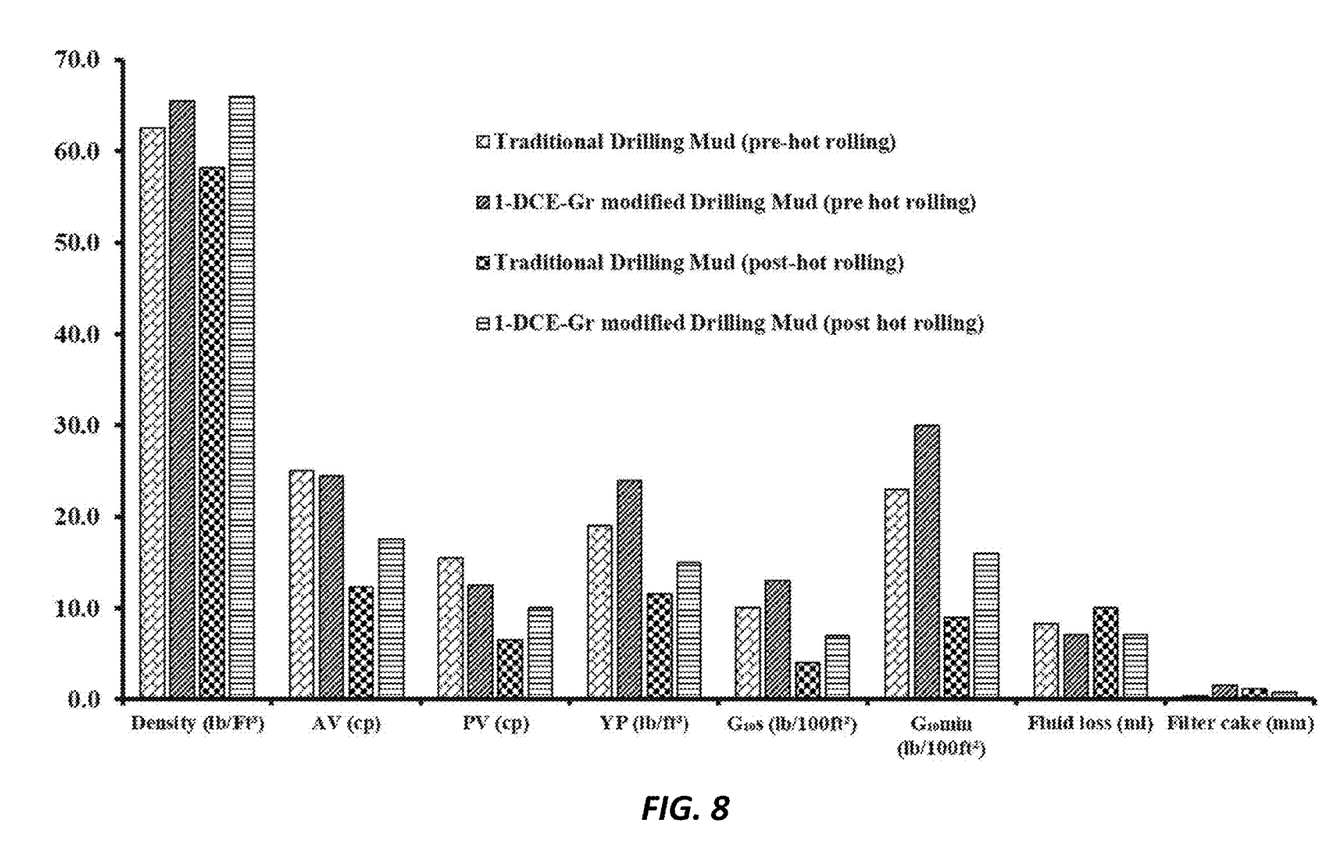
FIG. 8 depicts the rheological properties and fluid loss analysis of a traditional drilling mud and one that contains 1-DEC-GR, both before and after hot rolling.

The measurement of the density, specific gravity, apparent viscosity (AV), plastic viscosity (PV), yield point (YP) and fluid loss are depicted in FIG. 8. These rheological features can provide additional information about the shale inhibitor. FIG. 8 indicates that the traditional mud displays the highest apparent viscosity and that the apparent viscosity decreases upon the inclusion of a 1-DCE-Gr (0.85 wt %) shale inhibitor. FIG. 8 also indicates that the plastic viscosity of the drilling mud significantly decreases after addition of 1-DCE-Gr (0.85 wt %) and hot rolling at high temperature and pressure. The rheological study of the drilling mud further reveals that the yield point of a traditional mud significantly increases upon the addition of 1-DCE-Gr, indicating that the mud has an improved carrying capacity of cuttings.

The ability of shale to control fluid loss from a wellbore is dependent upon the nature of the wellbore fluid that is used. In order to evaluate the plugging capacity of the nanopores of shale, a filter loss method is used. The filtration volume is used as an indication of the plugging capability, e.g., the less filtration loss is a clear indication of the better performance of a drilling mud system. The 1-DCE-Gr modified mud display less filtration loss in both pre- and post-hot rolling tests as compared to the traditional mud. The less fluid loss can be accredited to the film formation of 1-DCE-Gr on the surface of filter paper that plug the pores and hinder the water flow from filter paper. The filtration volume of the 1-DCE-Gr was 7.1 mL, which was less than the 10 mL from the traditional mud. The formation of a less permeable film can be confirmed from the formation of the filter cake, whose width increase from 0.397 mm to 1.588 mm.

The gel strength is the ability of the drilling mud to suspend a solid material under static conditions. It is a quantification of the attractive forces within the drilling mud system in the absence of flow. The outcomes revealed that the addition of the 1-DCE-Gr prominently enhances the gel strength after both 10 s and 10 min as compared to a traditional drilling mud.

Figure 9:
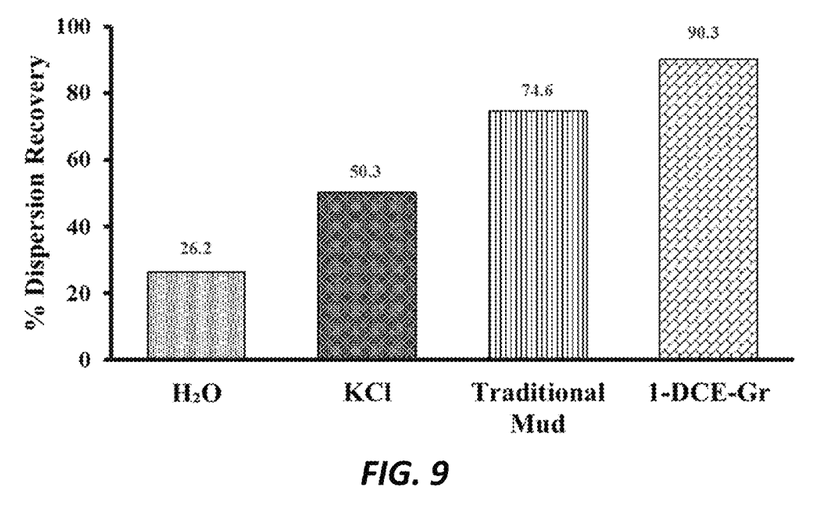
FIG. 9 depicts the results of a dispersion test of shale in the presence of $H_2O$, KCl, a traditional drilling mud, and a drilling mud containing 1-DEC-GR.

The amount of shale cuttings recovered after hot rolling indicates the quality of inhibition against dispersion. In the case of KCl, around half of the shale cuttings were lost as a result of reacting with the aqueous medium. However, in the case of traditional drilling mud, the recovery rate increased by 25% as compared to KCl. The addition of 1-DCE-Gr (0.85 wt. %) shale inhibitor, however, significantly increased the shale recovery up to 90%, as is shown in FIG. 9. The higher % recovery can be ascribed to adsorption of the 1-DCE-Gr to the surface of shale, which hinders the interaction of water with the shale surface and increases the resistance of the shale materials to the effects of the aqueous medium. This test confirms that 1-DCE-Gr provides a superior inhibitive performance as compared to traditionally used inhibition additives.

Figure 10:
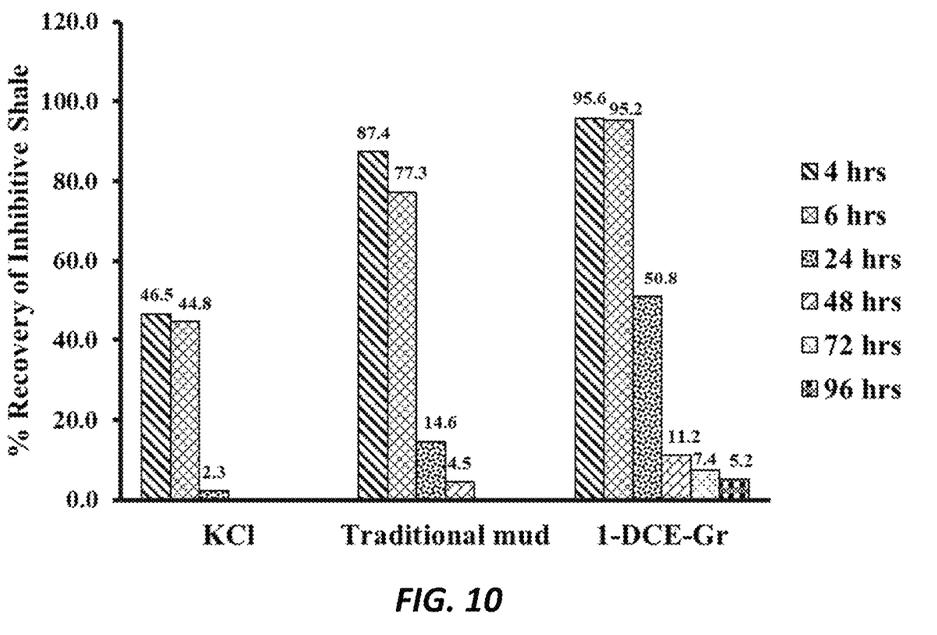
FIG. 10 depicts the results of an inhibition durability test of treated shale over several time periods.

The shale cuttings that were hot rolled in water for different periods of time revealed that the KCl inhibition does not last even for 4 hrs, with more than half of the shale cuttings being lost in that time. After 24 h, almost all of the shale cuttings disintegrated and disappeared, confirming the poor performance of KCl for shale inhibition. On the other hand, the traditional drilling mud demonstrates better resistance against the reactive aqueous medium for up to 6 hrs. However, after 24 hrs, just 14.6% of the shale cuttings were recovered. Finally, 1-DCE-Gr treated shale cuttings demonstrate remarkable resistance at an early stage for the wear and tear of the non-inhibitive fluid due to it providing a protective barrier against water. However, after time, there is a softening and weakening of the structure of the shale cutting matrix. Nearly half of the shale cuttings remain resistant to the reactive action of the water but once the shale weakens, it became difficult to protect the shale matrix against the damaging action of the water, and the shale matrix is quickly lost. As time passed, the rate of loss of shale cuttings became higher. Consequently, a further 90% decrease in the shale cutting quantity was observed. However, the resistance of 1-DCE-Gr treated shale cuttings against water reaction was significantly higher as compared to KCl or a traditional mud-treated shale, as shown by FIG. 10.

Figure 11:
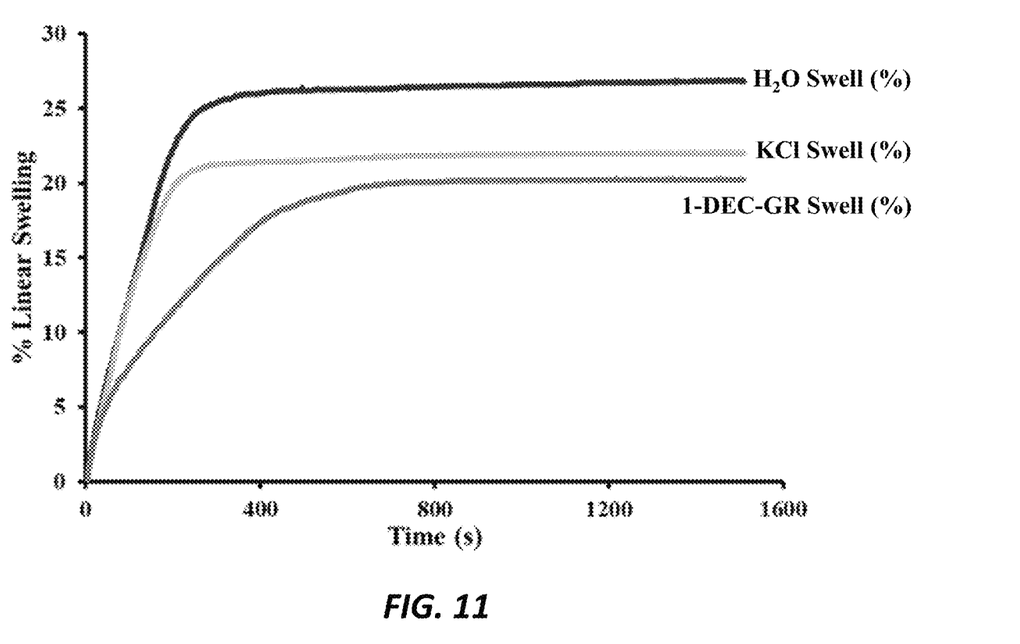
FIG. 11 depicts the results of a linear swelling test of shale in the presence of $H_2O$, KCl, and 1-DEC-GR.

The linear swelling rate measurement reflects the inhibition capacity of the 1-DCE-Gr shale inhibitor. For this purpose, the linear swelling of the clay materials was observed in water and aqueous solutions containing one of KCl and 1-DCE-Gr as shown in FIG. 11. 0.85 wt. % of the inhibitors were used to form an aqueous solution. The results demonstrate that water displays the highest percentage of linear swelling at 27%. However, while an aqueous solution of 0.85 wt. % of KCl prominently decreases the swelling to 22%, the aqueous solution of 1-DCE-Gr showed a remarkable shale swelling capacity of less than 20%. It was also observed that, in the case of $H_2O$ and KCl, the shale swelling rate was very fast in the beginning and achieved maximum swelling after 4 h. However, the 1-DCE-Gr also slowed down the rate of clay swelling and showed better swelling resistance, attaining a maximum swelling only at 11-12 h. The swelling test also confirms the results regarding the shale inhibition durability of the 1-DCE-Gr.

In Table 3, the prominent features of 1-DCE-Gr shale inhibitor were compared with other inhibitors utilized in WBMs.

TABLE 3

Comparison of 1-DEC-Gr with other literature shale inhibitors

| Compounds | Rolling recovery test | | Swelling rate test | | Rheological properties | | | | |
| --- | --- | --- | --- | --- | --- | --- | --- | --- | --- |
| | % Recovery | Conditions | % Swelling | Cond. | AV (cP) | PV (cP) | YP (Pa) | Fluid loss (mL) | Cond |
| BBDF | — | — | 13.1% swelling | In 70 wt. % solution | 34.5 | 26 | 8.5 | 6.2 | hot-rolling: 120° C., 3.5 MPa for 16 h |
| GO | — | — | — | — | — | — | — | 6.1 | 4 g/L solution of GO |
| EDA-Gr | 75.87% | 120° C. for 16 h in 0.2 wt. % solution | 62% reduction in swelling | In 0.2 wt. % solution | — | — | — | 10.5 | |
| 1-DCE-Gr | 90.3% | 66° C. for 16 h in 0.85 wt. % solution | 20.2% swelling | In 0.85 wt. % solution | 17.5 | 10.0 | 7.2 | 7.1 | hot-rolling: 66° C., 500 Psi for 16 h |

Key:
BBDF = biodiesel-based invert emulsion drilling fluid; Li W, Zhao X, Ji Y, et al., *J. Pet. Explor. Prod. Technol.*, 2016 6:505-517.
GO = graphene oxide; Kosynkin D V., Ceriotti G, Wilson KC, et al., *ACS Appl. Mater. Interfaces*, 2012, 4:222-227.
EDGA = ethylenediamine-modified graphene; Yuxiu A, Guancheng J, Yourong Q, et al., *J. Nat. Gas Sci. Eng.*, 2016 32:347-355.

The comparison revealed that the 1-DCE-Gr demonstrated better rolling recovery, comparable rheological properties, and controlled fluid loss. It is also important to mention that the 1-DCE-Gr was used in a small amount and provided improved drilling muds as compared to other materials reported in the literature. The biodiesel-based invert emulsion drilling fluid (BBDF) demonstrated better swelling capacity. However, it is crucial to note that the huge amount of ester in the form of biodiesel was utilized in that drilling mud formulation. The improvement in rheological features and higher inhibition durability makes the 1-DCE-Gr a striking additive for application in the field as compared to the compounds mentioned in Table 3.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C.

§ 112(f) for any limitations of any of the claims herein, except for those in which the claim expressly uses the words 'means for' together with an associated function.

What is claimed is:

1. A water-based wellbore fluid, comprising:
   an aqueous base fluid; and
   a modified graphene shale inhibitor that comprises one or more substituents that are covalently bonded to graphene via a linking group,
   wherein the modified graphene shale inhibitor is an undecanecarboxylate modified graphene.

2. The water-based wellbore fluid of claim 1, wherein the water-based wellbore fluid has an apparent viscosity in the range from about 10 to 35 cP.

3. The water-based wellbore fluid of claim 1, wherein the water-based wellbore fluid has a plastic viscosity in the range from about 1 to 25 cP.

4. The water-based wellbore fluid of claim 1, wherein the water-based wellbore fluid has a yield point in the range from about 2 to 15 Pa.

5. The water-based wellbore fluid of claim 1, further comprising one or more additives selected from the group consisting of weighting agents, viscosifiers, wetting agents, corrosion inhibitors, oxygen scavengers, anti-oxidants, biocides, surfactants, dispersants, interfacial tension reducers, pH buffers, mutual solvents, and thinning agents.

6. The water-based wellbore fluid of claim 1, wherein the water-based wellbore fluid is a water-based drilling mud.

7. A method of drilling a wellbore, the method comprising:
   circulating a water-based drilling mud as claimed in claim 1 into the wellbore while drilling.

8. The method of claim 7, wherein the water-based drilling mud has one or more of the group consisting of:
   an apparent viscosity in the range from about 10 to 35 cP;
   a plastic viscosity in the range from about 1 to 25 cP; and
   a yield point in the range from about 2 to 15 Pa.

9. The method of claim 7, wherein the water-based drilling mud has one or more of the group consisting of:
   a rolling recovery of shale cuttings of greater than 80%; and
   an inhibition durability recovery of greater than 85% after 6 hours.

* * * * *